US005603741A

United States Patent [19]
Frey

[11] Patent Number: 5,603,741
[45] Date of Patent: Feb. 18, 1997

[54] VACUUM CLEANER AND FILTER BAG WITH AIR MANAGEMENT

[75] Inventor: Robert A. Frey, Westlake, Ohio

[73] Assignee: HMI Industries, Inc., Cleveland, Ohio

[21] Appl. No.: 578,372

[22] Filed: Dec. 26, 1995

Related U.S. Application Data

[63] Continuation of Ser. No. 239,583, May 9, 1994, abandoned.

[51] Int. Cl.$^6$ .................................................. B01D 46/00
[52] U.S. Cl. .............................. 55/368; 15/347; 55/381; 55/467
[58] Field of Search .................................. 15/327.1, 347, 15/DIG. 8; 55/361, 368, 380, 381, 467

[56] References Cited

U.S. PATENT DOCUMENTS

| | | | |
|---|---|---|---|
| 1,383,615 | 7/1921 | Geier | 55/368 |
| 1,970,043 | 8/1934 | Kern | 55/368 |
| 2,024,143 | 12/1935 | Cameron | 55/368 |
| 2,242,277 | 5/1941 | Yonkers | 55/293 |
| 2,268,352 | 12/1941 | Taylor | 55/381 |
| 2,308,682 | 1/1943 | Fuge | 55/381 |
| 2,637,409 | 5/1953 | Turner et al. | 55/368 |
| 2,732,911 | 1/1956 | Gall | 55/368 |
| 3,732,075 | 5/1973 | Acaba | 55/368 |
| 4,784,676 | 11/1988 | Hale | 55/381 |
| 5,248,323 | 9/1993 | Stevenson | 95/90 |

FOREIGN PATENT DOCUMENTS

| | | | |
|---|---|---|---|
| 247590 | 4/1926 | United Kingdom | 55/368 |

*Primary Examiner*—C. Scott Bushey
*Attorney, Agent, or Firm*—Vickers, Daniels & Young

[57] ABSTRACT

Vacuum cleaner canisters and vacuum cleaner filter bags are provided with weir members disposed in the path of particle laden air flowing through the vacuum cleaner. The particle laden air flows across the top and/or side edges of the weir members creating a pressure drop thereacross and an area of low pressure on the downstream sides of the weir members whereby particles in the airstream are influenced to drop out of the airstream and into the low pressure areas.

10 Claims, 11 Drawing Sheets

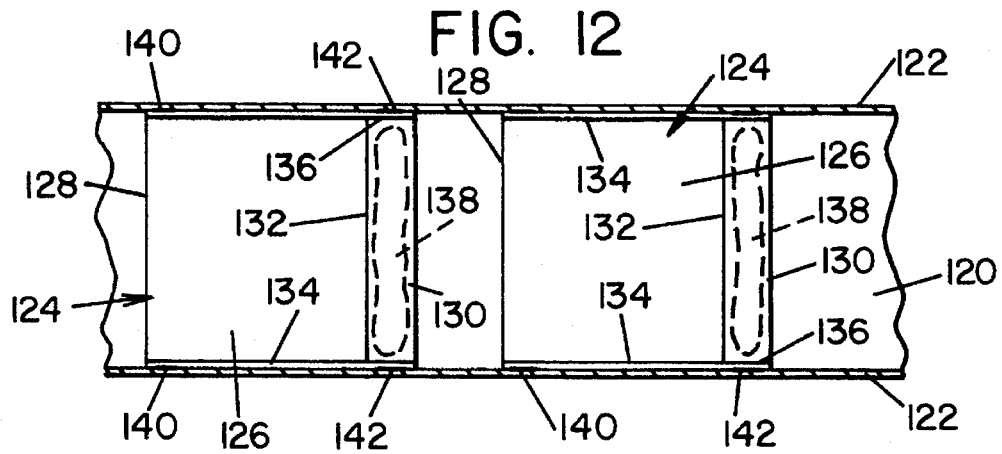
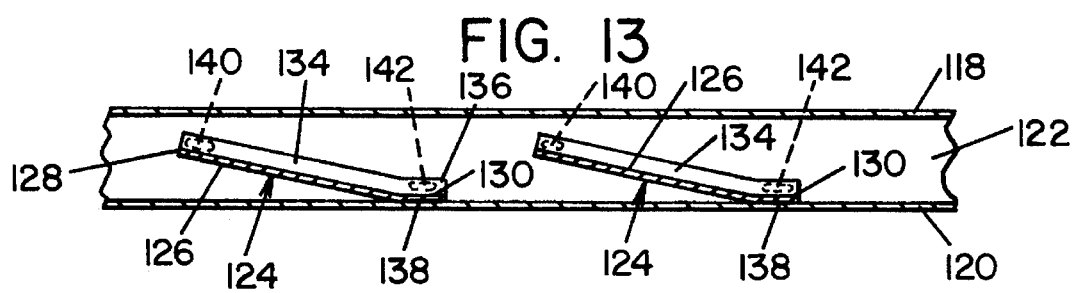
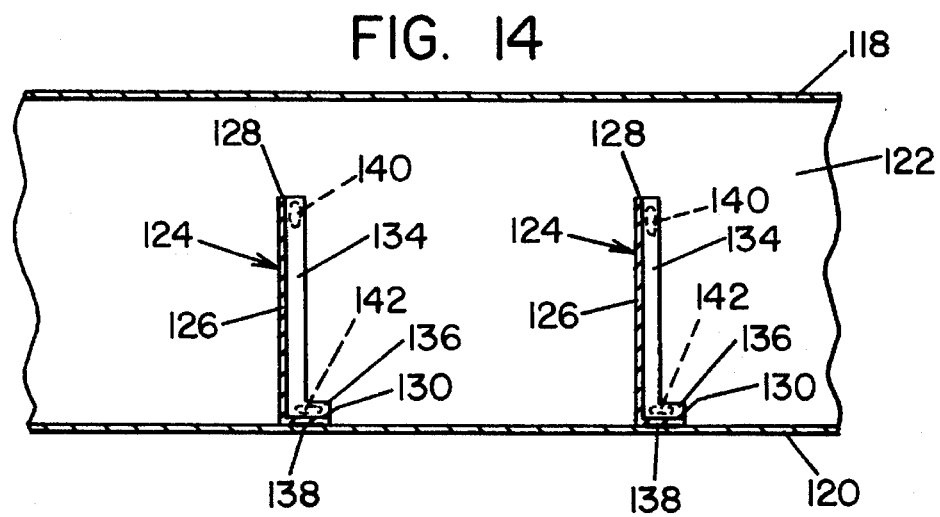
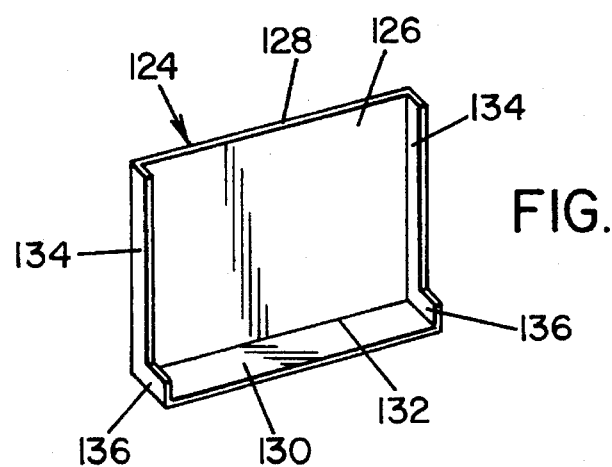

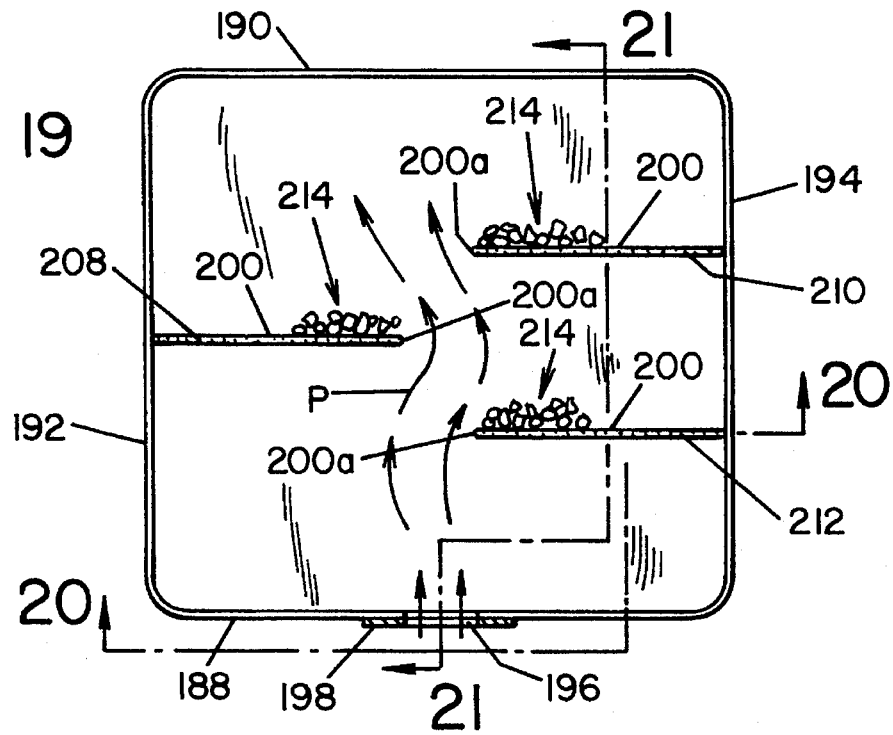
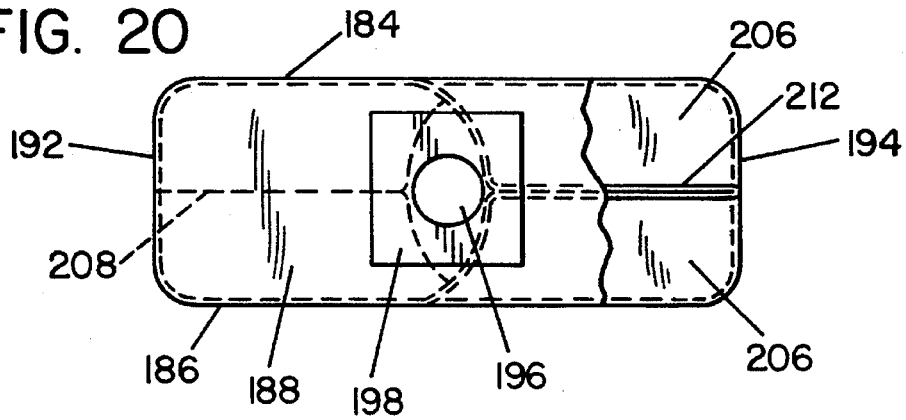
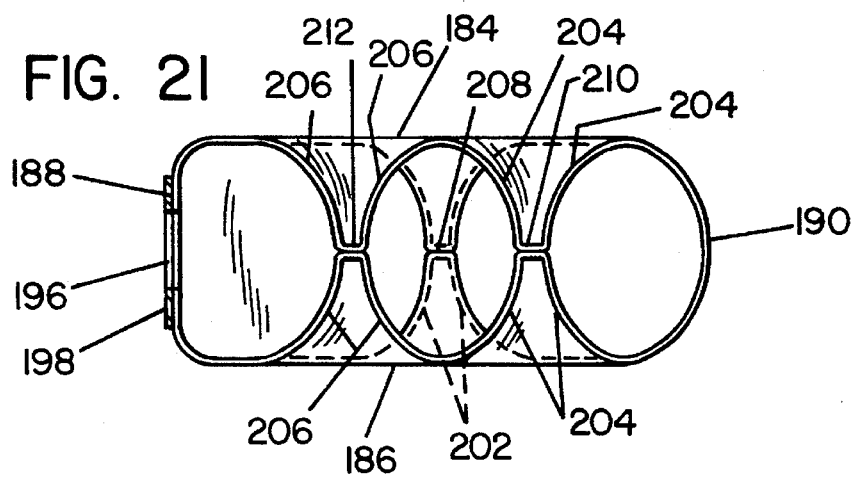

VACUUM CLEANER AND FILTER BAG WITH AIR MANAGEMENT

This is a continuation of application Ser. No. 239,583, filed May 9, 1994, now abandoned.

BACKGROUND OF THE INVENTION

This invention relates to the art of vacuum cleaning and, more particularly, to improvements in vacuum cleaners and filter bags for removing particulate materials from an airstream flowing therethrough.

The invention is particularly applicable to canister type vacuum cleaners of the character having a canister chamber wherein large particles in particle laden air carried into the chamber are extracted upstream from a filter through which the air flows and upon which finer particular material collects during a vacuum cleaning operation. At the same time, as will become apparent from the disclosure herein, the invention is applicable to canister and other vacuum cleaning apparatus such as upright vacuum cleaners in which particle laden air flows into a filter bag of air pervious material in which larger particles are collected and onto the inner surface of which smaller particulate material adheres as the cleaned air flows through the pervious bag material.

A canister type vacuum cleaner of the character to which the invention is particularly applicable is shown in U.S. Pat. No. 5,248,323 to Stevenson which is incorporated herein by reference for background information. Such a canister type vacuum cleaner includes a reduced velocity chamber with a high velocity air inlet through which particle laden air is drawn by a motor driven fan downstream of the air inlet and supported on top of the canister. A conical filter unit of air pervious material extends downwardly into the canister from the motor driven fan for removing and collecting dirt, debris and other particulate material carried by the airstream coming into the canister. Particle laden air is directed into the chamber so as to have a swirling or vortex flow configuration between the air inlet and filter unit so that large particles carried into the chamber with the inlet air are extracted by the vortex or cyclonic action of the air in the chamber. Thereafter, the air with minute particles still entrained therein is pulled upwardly through the conical filter unit which captures the minute particles, and the cleaned air is exhausted through an exhaust passage or passages above the canister.

Certain particles of dirt and other debris flowing into the canister, herein characterized as particles or particulate matter in an intermediate category, are not heavy enough to be extracted from the airstream by the swirling motion of the air and, consequently, impact and/or abrade against the inner wall of the canister and/or the filter element and break up into smaller particles which remain entrained in the airstream flowing through the filter and thus adhere to the later. It is of course the purpose of the filter to capture smaller particulate material so that the air exhausted from the vacuum cleaner is clean, but the breaking up of certain particles and debris in the intermediate category as described above results in the filter being more quickly clogged and, therefore, further results in requiring frequent cleaning or replacement of the filter in order to maintain a desired degree of efficiency in operation of the vacuum cleaner. Such filter clogging is also a problem with canister and/or upright type vacuum cleaners which employ a disposable filter bag through which particle laden air flows during a vacuum cleaning operation. In this respect, heavy particles will settle in the bottom of the bag, but certain debris in the intermediate category referred to above which is not heavy enough to be extracted from the airstream will remain entrained therein and will adhere to or break up and adhere to the inner surface of the bag so as to more quickly clog the bag than would be the case if these materials could be removed from the airstream before impinging against the inner surface of the filter bag. Often, when a canister type vacuum cleaner is opened for cleaning the filter unit, the canister chamber does not appear to be very full of debris and, similarly, when a canister or upright vacuum cleaner is opened to replace the filter bag therein, the filter bag does not appear to be very full, whereby it becomes obvious that the filter or filter bag has become clogged to the extent that cleaning or replacement is required long before the available capacity of the canister or filter bag is efficiently used. In either event, the frequent cleaning of the filter in a canister type vacuum cleaner is time consuming, and the frequent replacement of filter bags in canister or upright vacuum cleaners is both time consuming and expensive.

SUMMARY OF THE INVENTION

The present invention advantageously provides for increasing the efficiency with respect to which a vacuum cleaner removes particulate material from particle laden air by capturing certain dirt and other debris in the intermediate category which heretofore would ultimately adhere to the filter surface. More particularly, the present invention advantageously increases the time for the filter to become clogged to the extent that cleaning or replacement thereof is necessary and, accordingly, reduces down time for cleaning or replacement of the filter as well as the cost thereof in connection with disposable filters.

More particularly in accordance with the invention, the canister chamber or the interior of a filter bag through which particle laden air flows is provided with an air management arrangement for generating a pressure drop in the airstream and a low pressure area or areas for removing particles in the intermediate category from the airstream and which particles, as previously mentioned, are too small or too light to be extracted by their own weight but which, if not removed from the airstream, can adhere to the filter or potentially, can separate or break into small enough particles to remain entrained in the airstream and thus move into adherence with the filter or filter bag. The air management arrangement preferably comprises one or more weir members in the form of a wall extending transverse to the direction of air flow and, accordingly, having upstream and downstream sides with respect to the direction of airflow. The weir member intercepts or intersects the particle laden airstream and has an edge or edges between the opposite sides thereof whereby, as the air flows across the edge or edges, there is a pressure drop across the weir member and a low pressure area adjacent the downstream side thereof and into which particles in the intermediate category are influenced to move so as to be extracted from the airstream. Accordingly, these particles are extracted from the airstream so that they cannot adhere to the filter or filter bag as the air moves therethrough or break up into smaller particles which would adhere to the filter material. This advantageously provides for the filter or filter bag to be useable for longer periods of time between cleaning or replacement, thus to improve both the efficiency of the vacuum cleaner from the standpoint of time of use between filter cleanings or changes as well as the economy of use, especially with regard to replaceable filters. It is accordingly an outstanding object of the present invention to provide a vacuum cleaner with improved efficiency from the standpoint of the time of use between filter cleaning and/or replacement.

Another object is the provision of a vacuum cleaner with an improved ability to extract particulate material from a stream of particle laden air so as to prolong the usefulness of a filter or filter bag with respect to the time between successive filter cleaning or changing operations.

Still another object is the provision of a vacuum cleaner with an arrangement for managing the flow of particle laden air therethrough such that the filter or filter bag of the vacuum cleaner is useable for longer periods of time then heretofore possible before the filter or filter bag becomes clogged to the extent that air flow therethrough is undesirably restricted.

A further object is the provision of a vacuum cleaner or filter bag with an air management arrangement by which certain particles in a stream of particle laden air flowing therethrough are influenced to move out of the airstream and into low pressure areas to preclude the particles from adhering to the filter or breaking up into particles small enough to adhere to the filter.

Yet a further object is the provision of a vacuum cleaner or filter bag with a weir arrangement in which one or more weir members intercepts a stream of particle laden air flowing therethrough to create a pressure drop across each weir member and a low pressure area adjacent the downstream side thereof into which certain particles in the airstream are influenced to move.

BRIEF DESCRIPTION OF THE DRAWING

The foregoing objects, and others, will in part be obvious and in part pointed out more fully hereinafter in conjunction with the written description of preferred embodiments of the invention illustrated in the accompanying drawing in which:

FIG. 12 is a plan view of a foldable filter bag having weir members attached to the bottom and side walls of the bag;

FIG. 13 is a sectional elevation view showing the walls and weir members of the bag of FIG. 12 in the folded positions thereof;

FIG. 14 is a sectional elevation view showing the walls and weir members of the bag of FIG. 12 in the unfolded positions thereof;

FIG. 15 is a perspective view of a weir member for the bag shown in FIGS. 12–14;

FIG. 19 is a plan view somewhat schematically illustrating yet another embodiment of a filter bag having a weir arrangement in accordance with the present invention;

FIG. 20 is an elevation view of the bag partially in section, taken along line 20—20 in FIG. 19;

FIG. 21 is a sectional elevation view of the bag taken along line 21—21 in FIG. 19;

DESCRIPTION OF PREFERRED EMBODIMENTS

Figure 1:
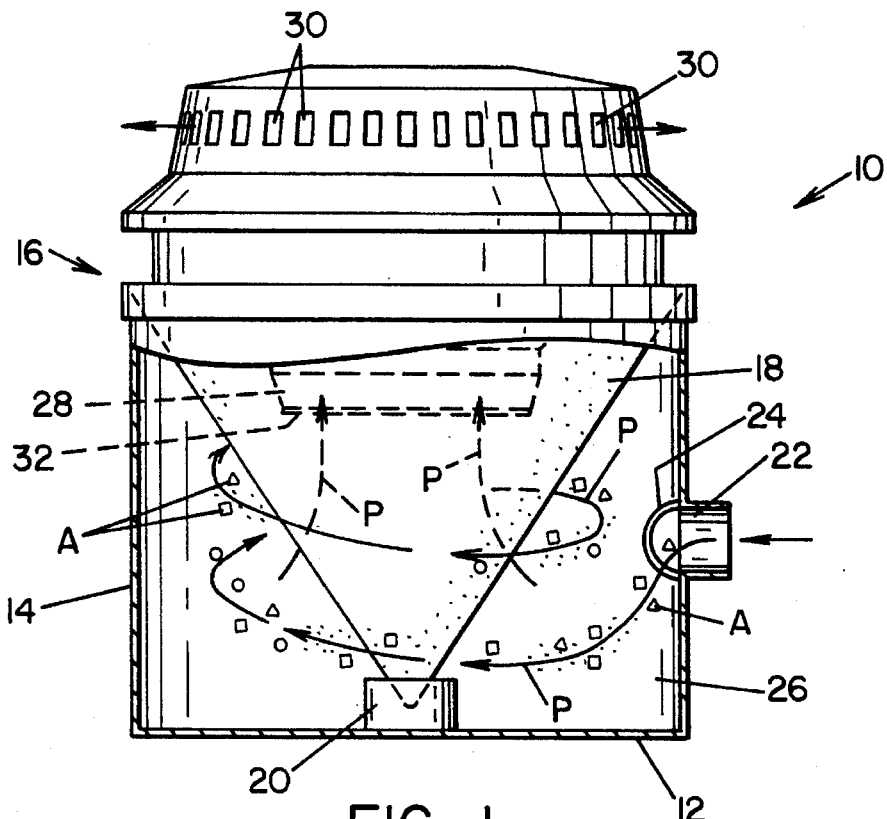
FIG. 1 is an elevation view, partially in section, of a prior art canister type vacuum cleaner.
Figure 2:
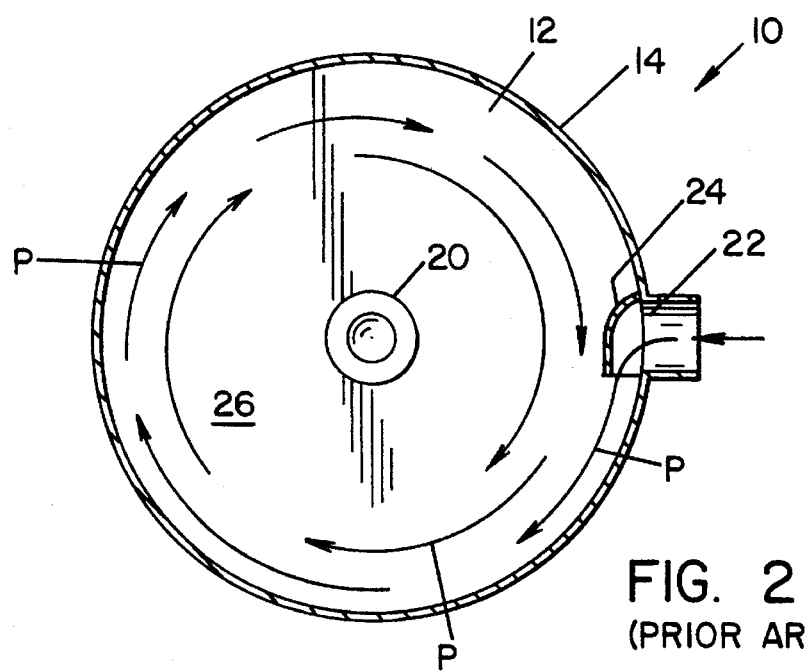
FIG. 2 is a plan view, in section, of the vacuum cleaner shown in FIG. 1.

Referring now in greater detail to the drawing, wherein the showings are for the purpose of illustrating preferred embodiments of the invention only and not for the purpose of limiting the invention, FIGS. 1 and 2 illustrate a vacuum cleaner 10 of the type disclosed in the aforementioned patent to Stevenson and which comprises a canister having a bottom wall 12, and upstanding circular side wall 14 and a removable housing 16 providing a cover for the canister and support for a motor driven fan, not shown. A filter unit including a conical filter element 18 of air pervious material is supported within the canister between housing 16 and a filter support 20 on bottom wall 12. Side wall 14 is provided with a circular high velocity air inlet 22 opening radially therethrough and an air deflector 24 on the inner side thereof for directing air into canister chamber 26 circumferentially of wall 14. The motor driven fan unit includes a lower inlet end 28 within filter 18 and an air exhaust shown as a plurality of exhaust ports or openings 30 spaced apart about the periphery of the upper end of housing 16. Preferably, the lower end of inlet 28 is covered by a secondary filter disc 32 which is upstream of the motor driven fan with respect to the direction of airflow through the vacuum cleaner to protect the latter from any particles which may pass through filter 18.

When the motor driven fan is in operation, particle laden air is drawn into canister chamber 26 through high velocity inlet 22 and flows through the chamber along a path illustrated by arrows P. As will be appreciated from FIGS. 1 and 2, path P initially is in the form of a vortex or cyclone of several convolutions followed by a generally upwardly extending direction in which the air being cleaned moves through conical filter 18 and through lower inlet end 28 of the motor driven fan unit to exhaust ports 30. Particles A of various sizes, shapes, weights and materials are entrained in the airstream drawn into chamber 26, and the heavier ones of such particles are extracted from the airstream by their weight and/or by centrifugal force as a result of the cyclonic movement of air through the canister chamber and fall to bottom wall 12 and are retained in chamber 26. Lighter particles remain entrained in the airstream and ultimately, with the passage of air through filter 18, adhere to the outer surface of the filter so as to be removed from the airstream. Many of the particles A are in the intermediate category somewhere between the heavier and lighter particles just referred to, and these particles are not heavy enough to be initially removed from the airstream by their weight or by centrifugal force and, at the same time, are larger or heavier than desired with respect to the possibility of adherence thereof to the filter. Moreover, many of the particles in the intermediate category will impact with one another and/or abrasively engage or impact against bottom wall 12 and side wall 14 while being carried in the cyclonic path of air flow through chamber 26 and, as a result of such abrasion or impact will break into smaller particles which will definitely remain entrained in the airstream and ultimately adhere to the outer surface of filter 18.

Figure 3:
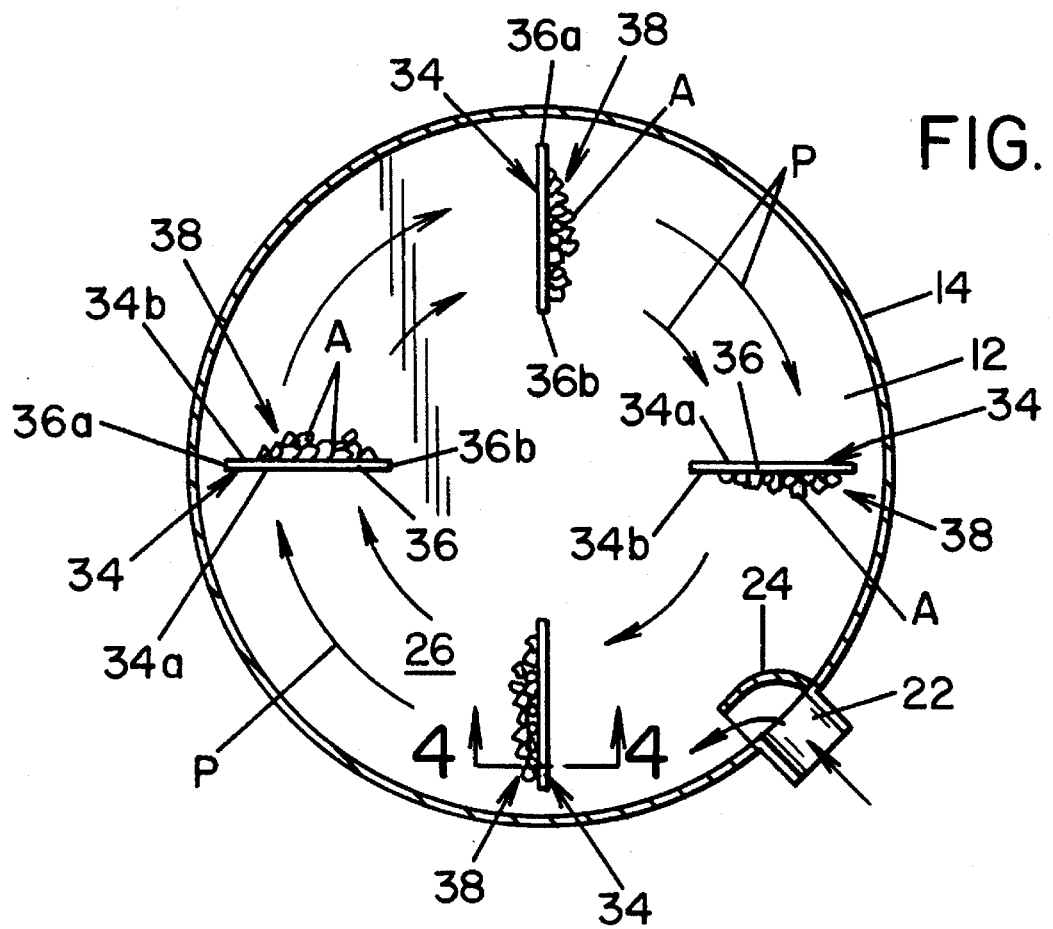
FIG. 3 is a plan view, in section, similar to FIG. 2 and showing the bottom wall of the canister with a weir arrangement in accordance with the present invention.
Figure 4:
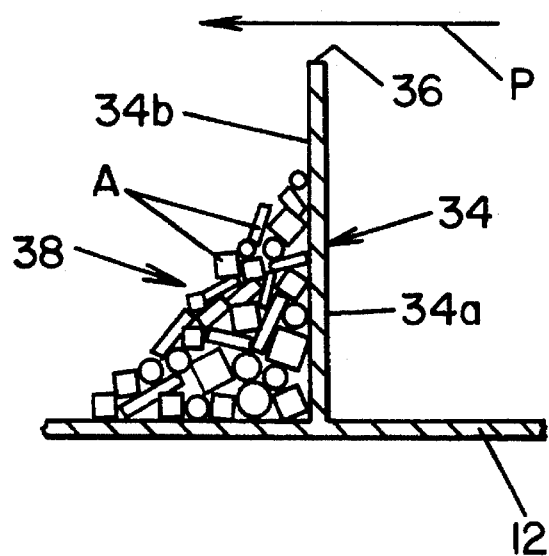
FIG. 4 is a sectional elevation view of one of the weir members taken along line 4—4 in FIG. 3.

Thus, it will be appreciated that there are particles in the intermediate category in the airstream which are not inclined to be extracted therefrom ahead of the filter but which, if extracted from the airstream other than by adherence to the filter, would reduce the quantity of particulate material captured by the filter during cleaning operations and thus lengthen the time that the vacuum cleaner can be efficiently used to clean air without having to clean or replace the filter element. In a canister type vacuum cleaner of the character described above, such removal of particles in the intermediate category is achieved in accordance with the present invention by providing a weir arrangement on bottom wall 12 of the canister, as shown in FIGS. 3 and 4 of the drawing. More particularly in this respect, bottom wall 12 of the canister is provided with weir members 34 which can be integral with or suitably secured to or supported on the bottom wall. In the embodiment illustrated, weir members 34 are in diametrically opposed pairs adjacent the inner periphery of side wall 14 and downstream of air inlet 22 with respect to the direction of air flow P into and around canister chamber 26. With respect to such direction of flow, each of the weir members has an upstream side 34a and a downstream side 34b. Further, in the embodiment illustrated in FIGS. 3 and 4, the weir members extend upwardly from bottom wall 12 and perpendicular thereto and are spaced radially inwardly of the inner periphery of canister wall 14, whereby each of the weir members has a top edge 36 between sides 34a and 34b, and vertically extending radially outer and radially inner edges 36a and 36b, respectively, between the opposite sides thereof.

As will become more apparent hereinafter, weir members 34 are of a height relative to air inlet opening 22 which provides for the weir member to intercept the stream of air flowing into chamber 26 so that at least a portion of the air flows unobstructed across top edge 36 of the weir member. This flow creates a pressure drop across the weir member between the upstream and downstream sides thereof and a low pressure area 38 adjacent the downstream side 34b of the weir member and into which particles A in the intermediate category referred to hereinabove are influenced to move by the pressure drop so as to be extracted from the airstream. These particles then will remain in the bottom of the canister and, by being removed from the airstream, will neither adhere to the vacuum cleaner filter nor be broken up by movement through canister chamber 26 to a size which would promote such adherence. It will be appreciated too that in the embodiment illustrated in FIGS. 3 and 4 the flow of air across outer and inner edges 36a and 36b of the weir members also creates a pressure drop which further defines the low pressure area adjacent the downstream side of the weir members to influence the movement of particulate material A out of the airstream and into the low pressure area. While four weir members are illustrated in this embodiment, it will be appreciated that it is only necessary to have at least one weir member to achieve removal of particulate material from the airstream and that, for a given vacuum cleaner design, more than four members might be desirable. Furthermore, the radially outer ends of the weir members can extend to canister wall 14, and/or the radially inner ends can extend to the center of bottom wall 12.

Figure 5A:
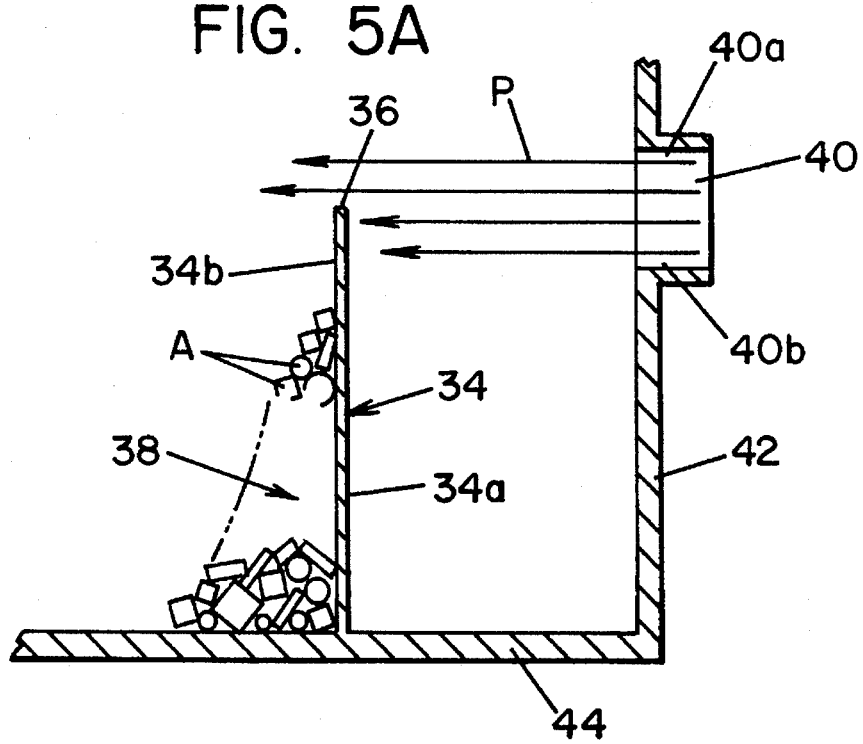
FIGS. 5A and 5B are sectional elevation views schematically showing a different air inlet arrangement for a canister type vacuum cleaner and relationships between the airstream and weir members in the canister.
Figure 5B:
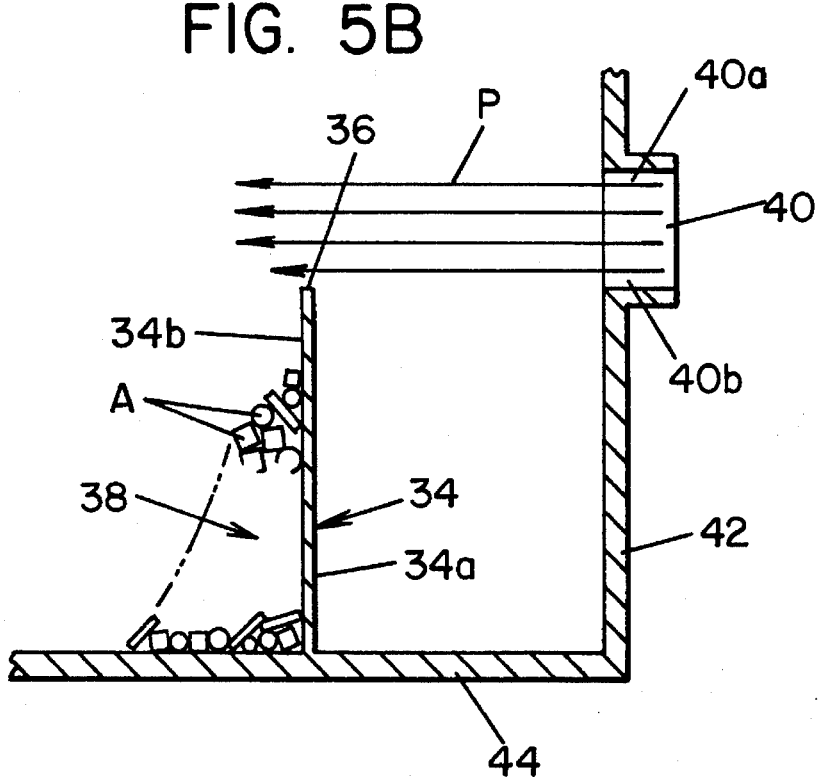

FIGS. 5A and 5B illustrate certain preferred dimensional relationships between the particle laden airstream and the edge of the weir member across which the air flows to create the desired pressure drop described above. In these figures, the airstream is illustrated as entering a canister through an air inlet opening 40 in a housing wall 42 and which opening 40 has upper and lower ends 40a and 40b respectively, spaced above bottom wall 44 of the canister. It will be appreciated that the airstream flowing along path P basically has a vertical dimension corresponding to the size of inlet opening 40 and, in FIG. 5A, weir member 34 is shown as having a vertical height which provides for upper edge 36 thereof to intercept the airstream a distance about half the vertical dimension thereof. It will be appreciated that this provides for a portion of the airstream to flow across top edge 36 unobstructed, thus to generate the pressure drop as described hereinabove. In FIG. 5B, weir member 34 is illustrated as having an upper edge 36 which is adjacent the lower end of the airstream. This too provides for unobstructed air flow across the top edge of the weir member so as to generate the desired pressure drop. As will be appreciated from FIGS. 5A and 5B, as the vertical height of weir member 34 decreases from that shown in FIG. 5B, the efficiency with respect to generating a pressure drop will decrease. Likewise, if the upper edge of the weir member is above the upper end of the airstream, the latter will impinge on the upstream side of the weir member thus to preclude generating a sufficient or efficient pressure drop for the intended purpose. Preferably, at least with regard to the weir member closest to the air inlet opening, the weir member has a vertical height which is preferably no greater than the upper end of the air inlet opening. In this respect, it is desirable to maintain optimum air flow into the canister and, as the dimension of the weir member approaches the upper dimension of the airstream the desired air flow is progressively impaired.

Figure 6:
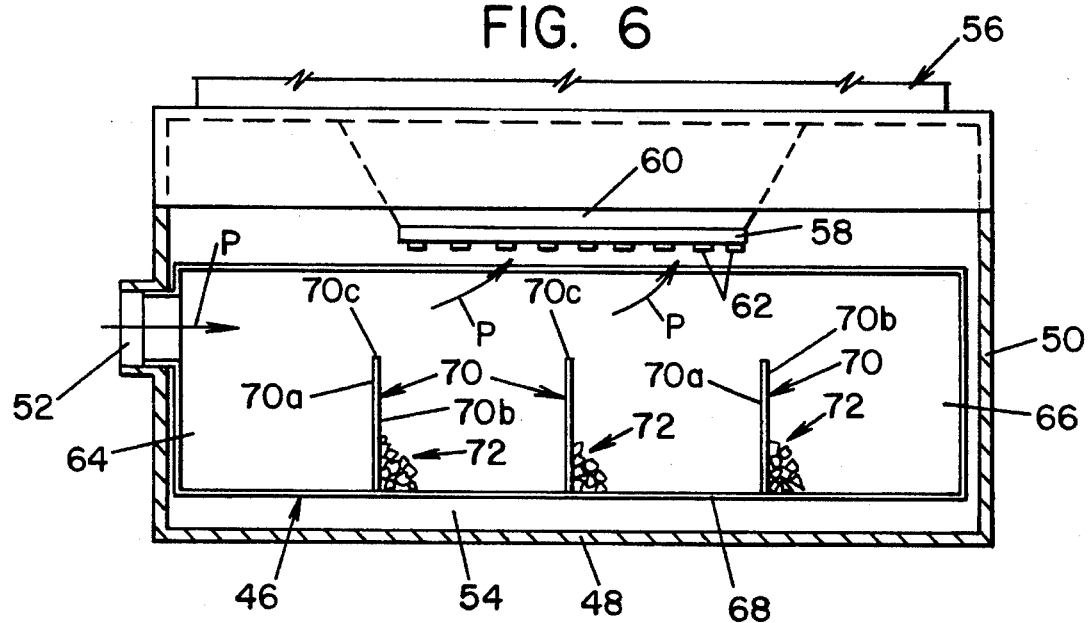
FIG. 6 is a sectional elevation view somewhat schematically illustrating a canister vacuum cleaner of the type employing a filter bag and showing a filter bag therein having a weir arrangement in accordance with the present invention.

FIG. 6 illustrates yet another canister type vacuum cleaner and one which, in this instance, employs a filter bag 46 of air pervious material for collecting particulate matter from particle laden air. More particularly, the canister includes a bottom wall 48 and an upstanding sidewall 50 which may be circular or of other configuration and which is provided with a circular air inlet 52 opening into canister chamber 54. In this embodiment, a motor driven fan housing 56 closes the canister and provides for creating the flow of a stream of air through inlet opening 52 along a path P into filter bag 46 and thereafter upwardly through the filter bag and a secondary filter 58 on the lower end of air inlet 60 of the motor driven fan unit. Secondary filter 58 may, for example, be configured or provided with nodes 62 to preclude the top of filter bag 46 from sealing against filter 58 and thus promoting clogging of the underlying portion of the top wall of filter bag 46. Filter bag 46 has upstream and downstream ends 64 and 66, respectively, with respect to the direction of air flow P into the bag and includes a bottom wall 68 which, in accordance with the present invention, is provided with a plurality of weir members 70 spaced apart in the direction of air flow between the upstream and downstream ends of the filter bag. As is well known in connection with canister or other types of vacuum cleaners using filter bags, particle laden air to be cleaned flows into the inlet end of the bag and the air flows through the air pervious material of the bag. Thus, lighter particulate material entrained in the airstream is extracted therefrom by adhering to the inner surface of the bag and heavier and larger material is extracted by falling to the bottom of the bag. As described hereinabove there is an intermediate category of particulate material which may not be heavy enough to fall out of the airstream and which may adhere to the filter or break up and then adhere to the filter, thus reducing the useful life of the filter. As with the embodiments described hereinabove, weir members 70 are operable to extract particulate material in the intermediate category from the airstream so as to promote a longer life for the filter bag. In this respect, weir members 70 have upstream and downstream sides 70a and 70b, respectively, and a top edge 70c therebetween and across which particle laden air flows to produce a low pressure area 72 adjacent the downstream side of the weir member and into which particulate material in the airstream is influenced to move as a result of the pressure drop. The weir members can be made from the same air pervious material used to construct the filter bag and can, for example, be secured to the bottom and side walls of the bag such as by gluing.

Figure 7:
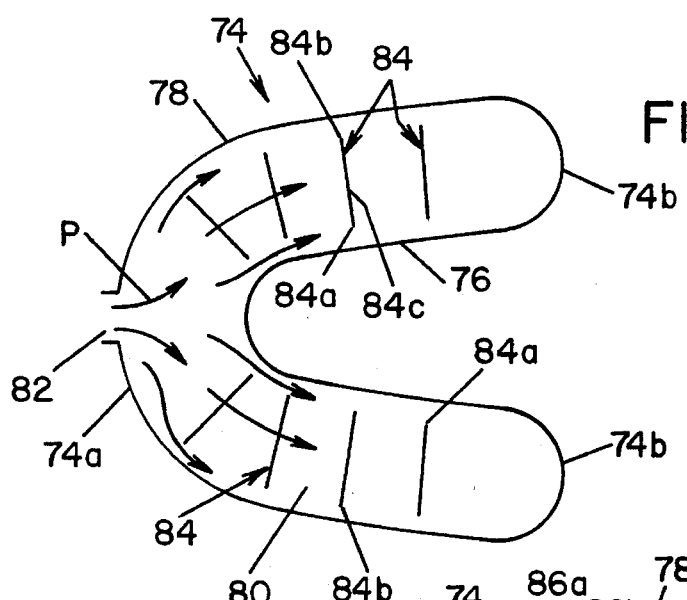
FIGS. 7 and 8 are plan views schematically illustrating different weir arrangements inside another style of a filter bag for a canister type vacuum cleaner using a filter bag.
Figure 8:
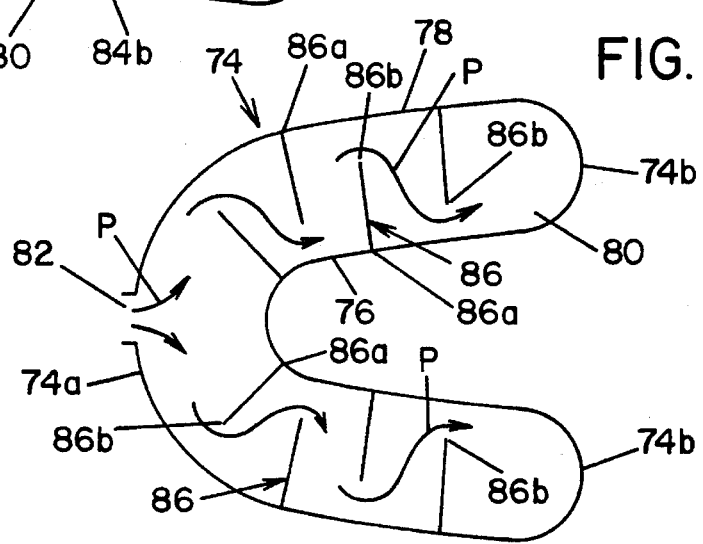

FIGS. 7 and 8 schematically illustrate another configuration of a filter bag of air pervious material used in canister type vacuum cleaners and provided with weir members for the purpose described hereinabove. More particularly, with reference first to FIG. 7, filter bag 74 is schematically illustrated in plan view and is generally U-shaped and comprised of generally parallel inner and outer sidewalls 76 and 78, respectively, a bottom wall 80 and a top wall, not shown, which is spaced apart and generally parallel to bottom wall 80. The filter bag is provided with an inlet opening 82 in the bight portion of U-shaped outer wall 78 and through which a stream of particle laden air to be cleaned flows. The particle laden air flows into each leg of the filter bag along a corresponding path P, whereby it will be appreciated that the filter bag has upstream and downstream ends 74a and 74b, respectively, with respect to such direction of airflow. In accordance with the present invention, the filter bag is provided with a plurality of weir members 84 spaced apart in the direction between the upstream and downstream ends of the filter bag and accordingly having upstream and downstream sides, not designated numerically. As will be appreciated from the previous description, the weir members intercept the stream of air flowing through the filter bag and, in the embodiment illustrated in FIG. 7, each of the weir members has opposite side edges 84a and 84b, respectively spaced inwardly from side walls 76 and 78 of the filter bag. Preferably, the weir members have top edges 84c spaced from bottom wall 80 such that particle laden air flows across the top edges as well as around the side edges to create low pressure areas on the downstream sides of the weir members for collecting particles in the intermediate category as described hereinabove. It will be appreciated, however, that weir members 84 in this embodiment could extend completely between the bottom and top walls of the filter bag, whereby the pressure drop in the low pressure area on the downstream sides of the weir members would be generated by the flow of particle laden air across the opposite side edges of the weir members. Likewise, it will be appreciated that the weir members could extend completely between walls 76 and 78 with top edges 84c spaced from the top wall.

Another arrangement of weir members for filter bag 74 is schematically illustrated in FIG. 8. In this respect, filter bag 74 is provided with a plurality of weir members 86 spaced apart in the direction between the upstream and downstream ends of the filter bag, and each of the weir members 86 has upstream and downstream sides, not designated numerically, and corresponding outer and inner side edges 86a and 86b, respectively. In this embodiment, adjacent ones of the weir members 86 have outer side edges 86a thereof attached to a different one of the sidewalls 76 and 78 of the filter bag. Further, the weir members extend inwardly from the corresponding one of the sidewalls 76 and 78 to the extent that inner edges 86b of adjacent ones of the weir members overlap in the direction between sidewalls 76 and 78. This provides for the stream of particle laden air flowing into the filter bag to follow a sinuous path P in the direction between the upstream and downstream ends of the filter bag. Preferably, weir members 86 extend between the top and bottom walls of the filter bag, whereby the desired pressure drop and creation of low pressure areas adjacent the downstream sides of the weir members results from the flow of air across the inner edges 86b of the weir members.

Figure 9A:
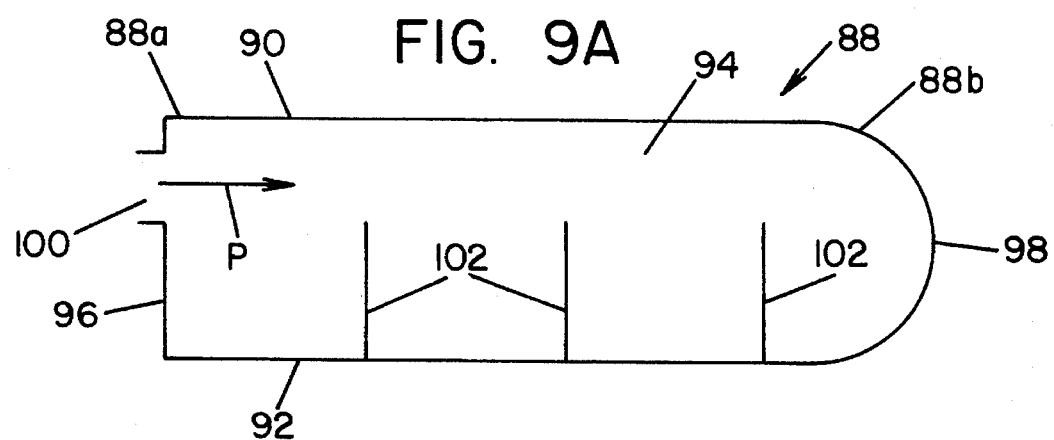
FIGS. 9A and 9B schematically illustrate a foldable filter bag having a weir arrangement in accordance with the present invention.
Figure 9B:
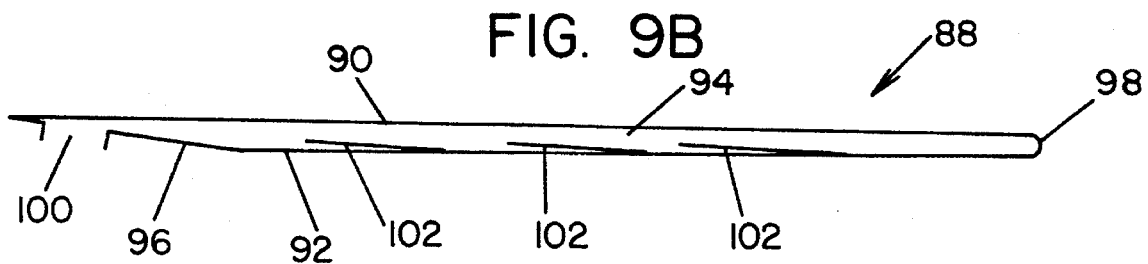

FIGS. 9A and 9B schematically illustrate a collapsible vacuum cleaner filter bag 88 having weir members on the interior thereof in accordance with the present invention. More particularly in this respect, filter bag 88 is illustrated in FIG. 9A in the expanded or unfolded position and in FIG. 9B in the collapsed or folded position for storage prior to use. Filter bag 88 is constructed of air pervious material and comprises a top wall 90, a bottom wall 92, spaced apart side walls 94 and opposite end walls 96 and 98. End wall 96 is provided with an air inlet opening 100 through which particle laden air flows into the bag in the direction of path P, whereby the bag has upstream and downstream ends 88a and 88b, respectively, with regard to the direction of air flow there into. A plurality of weir members 102 are provided on the interior of the filter bag in spaced apart relationship between the upstream and downstream ends thereof and are secured to the bottom wall and side walls of the filter bag so as to be displaceable therewith and relative thereto between the unfolded and folded positions respectively shown in FIGS. 9A and 9B. One possible structural arrangement for securing the weir members within a collapsible bag for this purpose is illustrated and described hereinafter. As will be appreciated from the descriptions of the preceding embodiments, when filter bag 88 is in the unfolded position shown in FIG. 9A, the flow of particle laden air along path P and across the top edges of weir members 102 causes a pressure drop which creates low pressure areas adjacent the downstream sides of weir members 102, whereby particles in the intermediate category referred to herein are influenced to drop out of the airstream and into the low pressure areas so as to prolong the useful life of the filter bag.

Figure 10A:
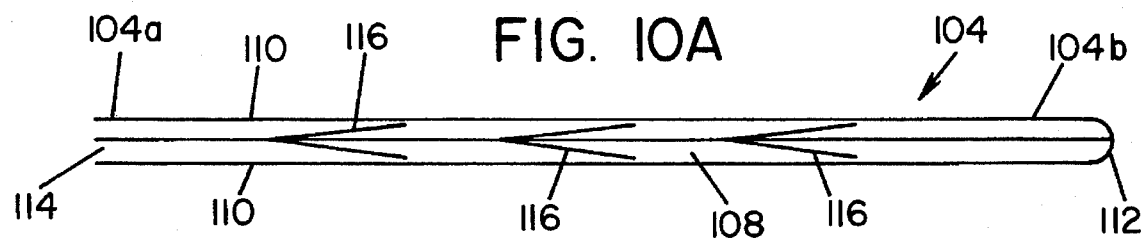
FIGS. 10A and 10B are plan views schematically illustrating another embodiment of a foldable filter bag having a weir arrangement in accordance with the present invention and respectively showing the bag in its folded and unfolded positions.
Figure 10B:
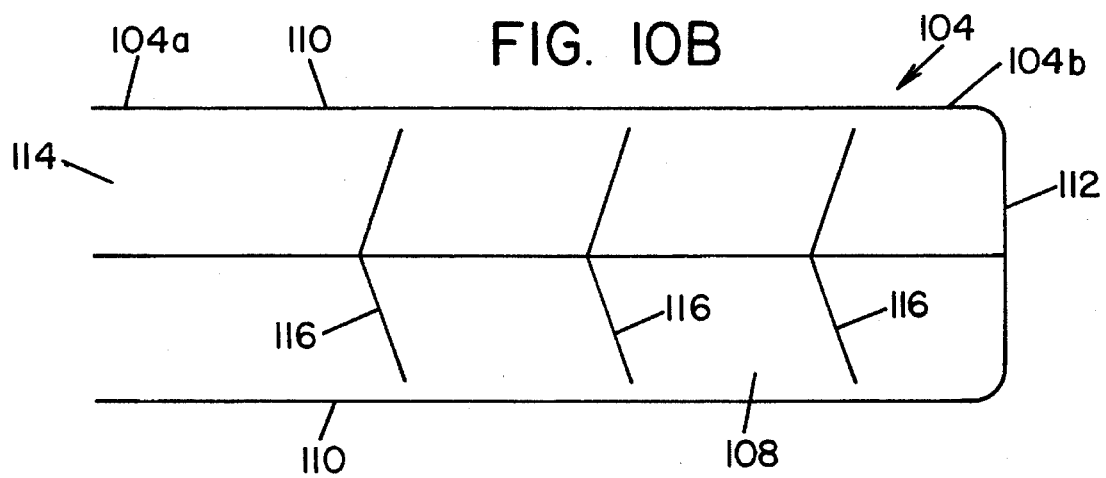
Figure 11A:
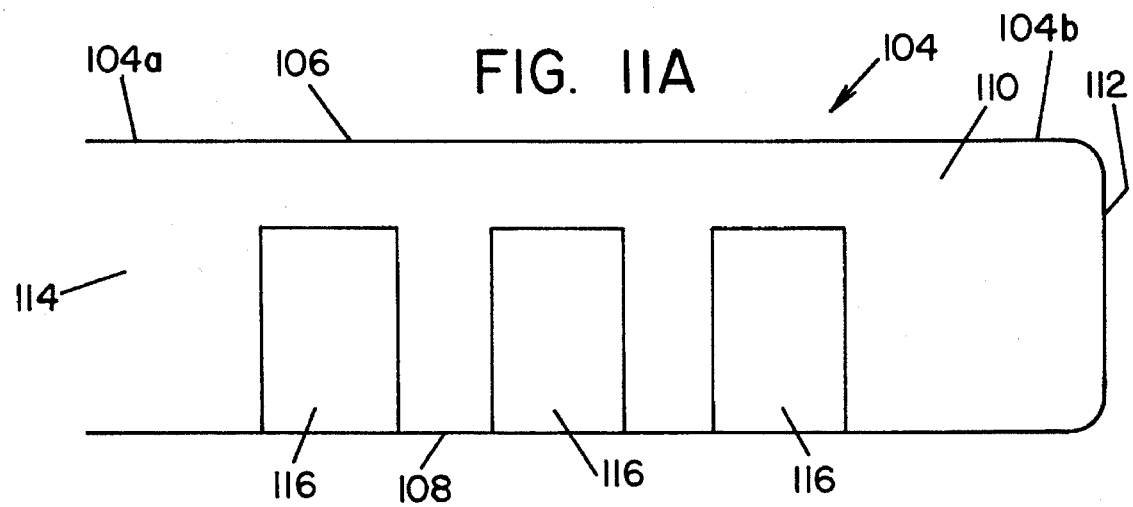
FIGS. 11A and 11B are side elevation views schematically illustrating the bag of FIGS. 10A and 10B in the folded and unfolded positions thereof.
Figure 11B:
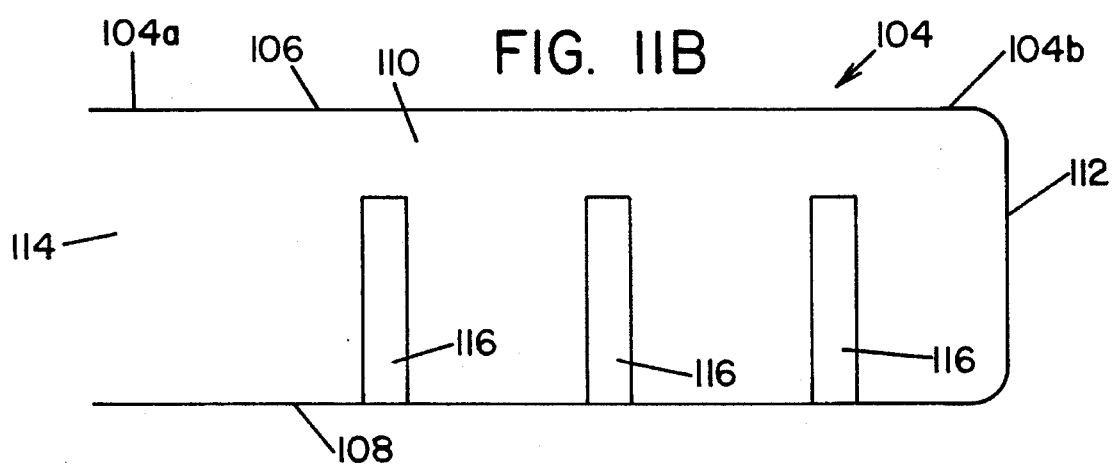

FIGS. 10 and 11 schematically illustrate another form of a collapsible vacuum cleaner filter bag having weir members therein in accordance with the present invention. FIGS. 10A and 10B are plan views respectively illustrating the bag in the folded and unfolded positions, and FIGS. 11A and 11B are side elevation views respectively illustrating the bag in the folded and unfolded positions. In this embodiment, filter bag 104 is constructed from air permeable material and comprises pleated top and bottom walls 106 and 108, respectively, opposite side walls 110, and an end wall 112 at one end thereof. As designated by numeral 114, the opposite end of the bag is open and, in a well known manner, is adapted to be collapsed about the air supply tube of a vacuum cleaner and held in place thereabout such as by a garter spring. Accordingly, end 114 provides an inlet opening for the flow of particle laden air into the filter bag which accordingly has upstream and downstream ends 104a and 104b, respectively, with respect to the direction of airflow thereinto. Pleated bottom wall 108 is provided with a plurality of pleated weir members 116 having lower edges suitably secured to bottom wall 108 for folding therewith between the folded and unfolded positions of the bag. When the bag is in the unfolded position, as shown in FIGS. 10B and 11B, it will be appreciated that particle laden air flowing into the bag will flow across the top edges and about the side edges of weir members 116 to achieve the removal of particles in the intermediate category in the manner previously described. When collapsed for storage prior to use, weir members 116 fold with the pleated bottom wall so as to be sandwiched between opposite side walls 110 of the filter bag.

FIGS. 12–15 illustrate one possible construction for weir members and the connection thereof to adjacent walls of a collapsible or foldable vacuum cleaner filter bag. As is well known, such collapsible filter bags are constructed from air pervious material which is paper-like and quite flexible, whereby it will be appreciated that the walls of the filter bag and the weir members connected thereto are readily foldable and displaceable relative to one another between the folded and unfolded dispositions of the bag. Referring now to FIGS. 12–15 wherein the bag is only partially shown, the bag is comprised of top and bottom walls 118 and 120, respectively, and opposite sidewalls 122. Weir members 124 can be constructed of the same material as the bag and comprise a weir panel 126 having an upper edge 128 and a lower end defined by a mounting leg 130 with respect to which panel 126 is foldable along a fold line 132. The opposite sides of weir member 124 are defined by L-shaped mounting legs including an upper portion 134 along each of the opposite side edges of panel 126 and a lower portion 136 along each of the opposite side edges of mounting leg 130. The weir members are mounted in the filter bag by adhesively bonding mounting leg 130 to bottom wall 120, adhesively bonding lower mounting leg portions 136 to side walls 122, and adhesively bonding the upper ends of upper mounting legs 134 to side walls 122. Preferably, the bonding adhesive is applied completely across mounting leg 130, as indicated by numeral 138 in FIG. 12, while dabs of adhesive are used to bond the upper ends of upper mounting leg potions 134 and the lower mounting leg portions 136 to side walls 122 as respectively designated by numerals 140 and 142 in FIGS. 12–14. The later bonding provides for optimum flexibility with respect to the relative displacement between the bag walls and weir members during displacement of the filter bag between the folded and unfolded positions thereof.

Figure 16:
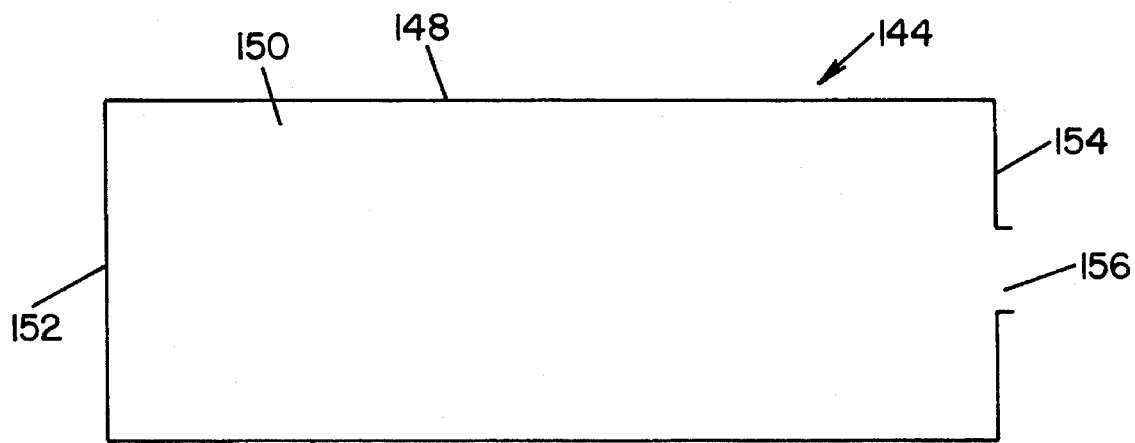
FIG. 16 is an elevation view schematically illustrating a prior art filter bag having an air inlet at one end thereof.
Figure 17:
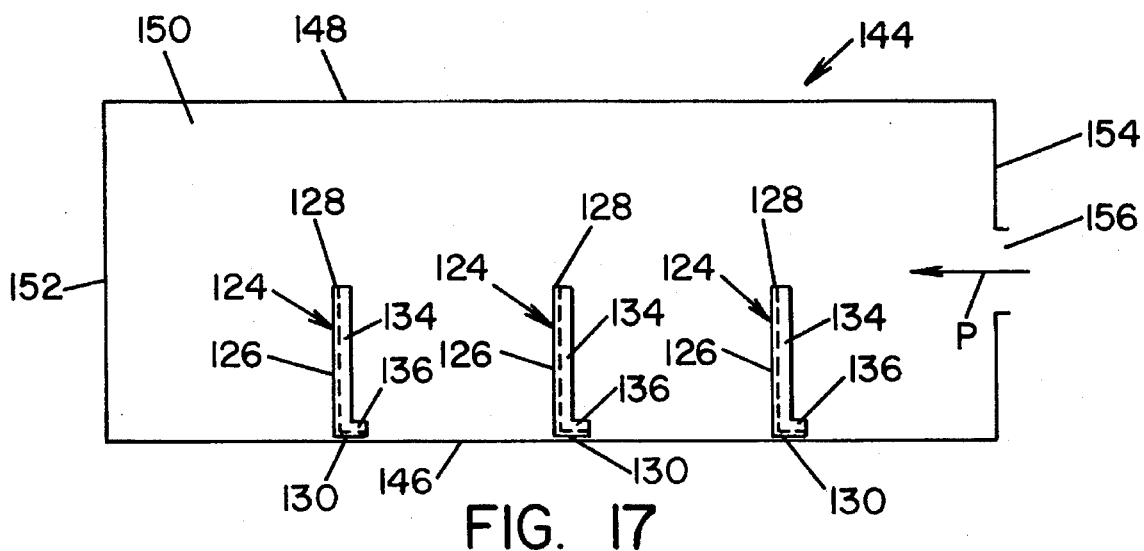
FIG. 17 is an elevation view schematically illustrating the filter bag of FIG. 16 with weir members according to the present invention.

FIG. 16 schematically illustrates a prior art non-collapsible or non-foldable filter bag for canister type vacuum cleaners, and FIG. 17 schematically illustrates a modification of such bag to include weir elements of the structure illustrated in FIG. 15 and described above. More particularly with regard to FIGS. 16 and 17, canister type filter bag 144 is constructed from air pervious material and comprises a bottom wall 146, top wall 148, opposite side walls 150 and opposite end walls 152 and 154. End wall 154 is provided with a central air inlet opening 156 through which particle laden air to be cleaned is introduced into the filter bag, whereby it will be appreciated that ends 154 and 152 provide the filter bag with upstream and downstream ends, respectively, with regard to the direction of flow of air into the bag. As will be appreciated from FIG. 17, and the previous description of weir members 124 shown in FIG. 15, a plurality of weir members 124 are adhesively bonded to bottom wall 146 and side walls 150 of filter bag 144 in spaced apart relationship between the upstream and downstream ends of the bag. As will be further appreciated from the description of earlier embodiments herein, weir panels 126 are of a height above bottom wall 146 of the filter bag to provide for upper edge 128 of the panels to intercept the stream of air flowing through inlet opening 156 in the direction of path P such that there is a pressure drop across the weir members and thus low pressure areas adjacent the down stream sides thereof to influence particulate material in the airstream which is in the intermediate category referred to herein to drop into the low pressure areas.

Figure 18:
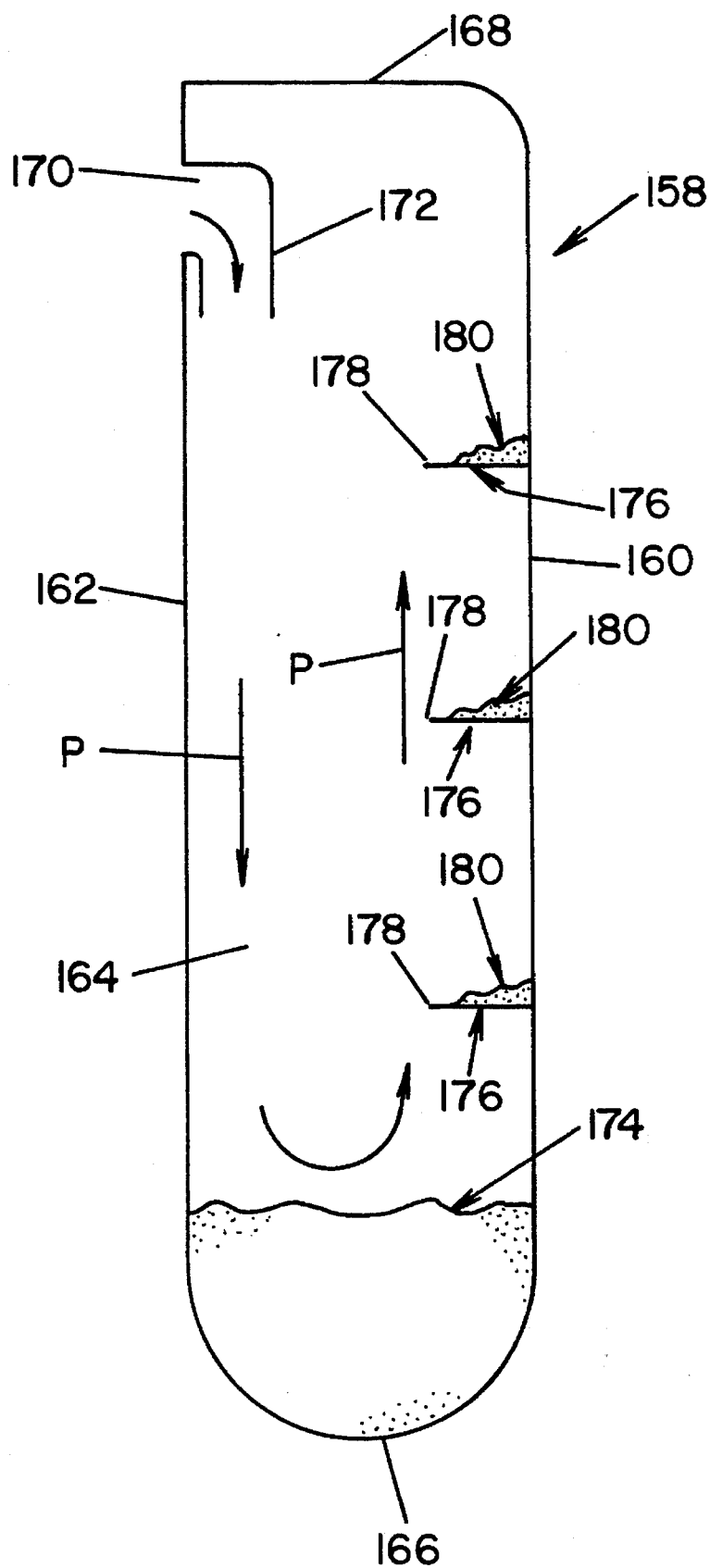
FIG. 18 is an elevation view schematically illustrating a filter bag for an upright vacuum cleaner provided with weir members according to the present invention.
Figure 22A:
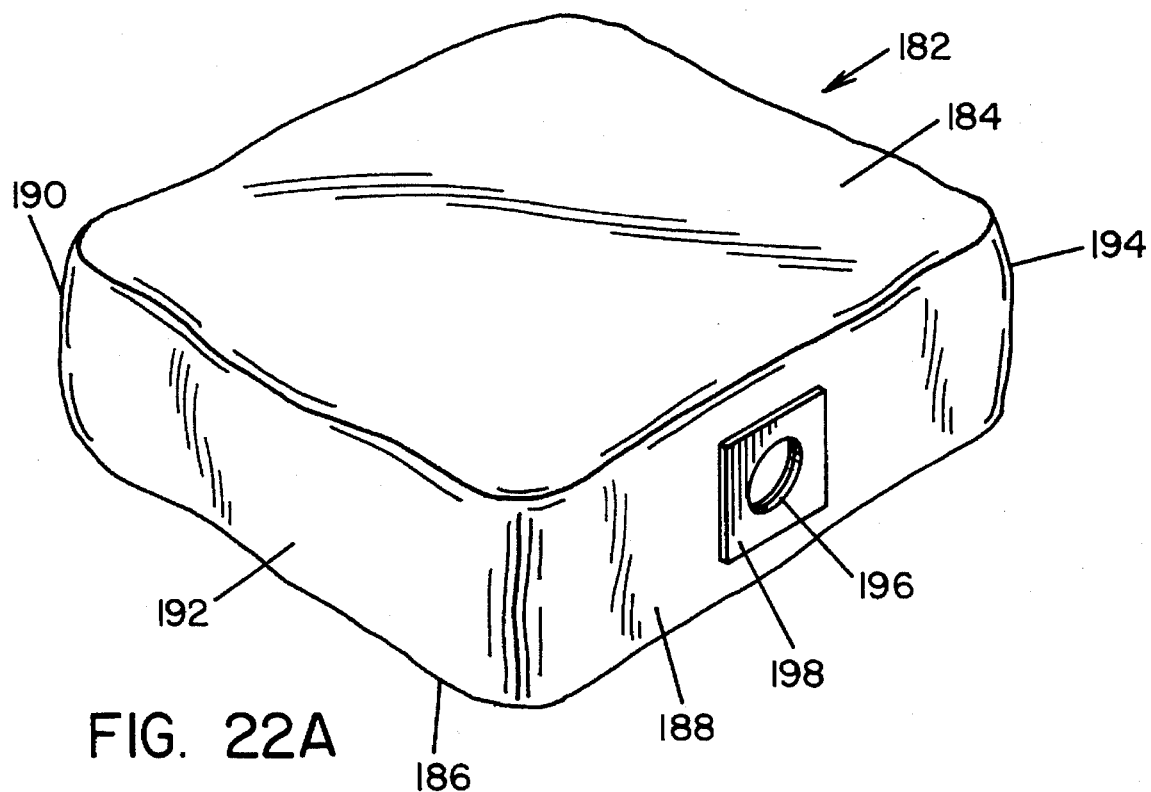
FIG. 22A is a perspective view of the bag prior to pleating thereof.
Figure 22B:
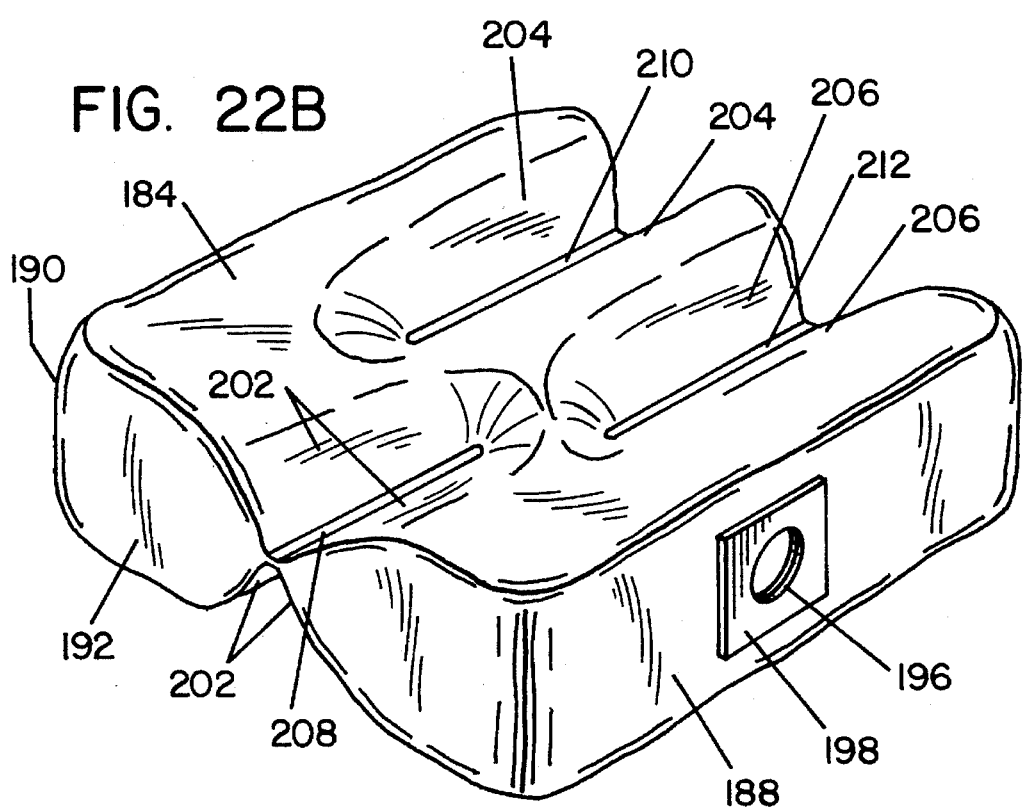
FIG. 22B is a perspective view of the bag following pleating thereof.

While considerable emphasis has been placed herein on the applicability of the present invention to canister type vacuum cleaners and filter bags for canister type vacuum cleaners, the invention is also applicable to filter bags used in conjunction with upright type vacuum cleaners. One such filter bag for an upright vacuum cleaner is illustrated in FIG. 18 and designated generally by the numeral 158. Filter bag 158 is constructed from air permeable material and comprises front and rear vertical walls 160 and 162, respectively, opposed vertical side walls 164, bottom wall 166 and top wall 168. Rear wall 162 is provided adjacent the upper end thereof with an air inlet opening 170 by which the bag is adapted to be attached to the air supply tube of the vacuum cleaner, and the interior of the bag is provided with an air deflector 172 by which particle laden air entering the filter bag is directed downwardly parallel to rear wall 162. The stream of particle laden air flows in bag 158 along a path P which extends downwardly along rear wall 162 and vents upwardly relative to front wall 160 and, is well known, clean air exits through the walls of the filter bag and vents through exhaust paths provided by an air permeable outer bag or provided in a ridged housing portion in which the filter bag is disposed. As the particle laden air flows through the filter bag in the foregoing manner, heavier particulate material in the airstream is extracted therefrom by gravity and falls to and accumulates in the lower end of the bag as designated in FIG. 18 by the numeral 174. Particulate material in the airstream which is in the intermediate category, however, remains entrained in the airstream and either adheres to the inner surfaces of the filter bag walls or breaks up into smaller particles which adhere to the filter walls, thus decreasing the useful life of the filter bag in comparison with that which would be obtained by extracting the particulate matter in the intermediate category from the airstream other than by adherence to the filter surface. This is achieved in accordance with the present invention by providing the interior of bag 158 with a plurality of weir members 176 on the inner side of front wall 160 in a manner whereby the weir members are spaced apart in the direction of path P and have upstream and downstream sides relative to the direction of air flow along path P. Weir members 176 are suitable secured to front wall 160 of the filter bag and between sidewalls 164 thereof, whereby particle laden air flowing across inner edges 178 of the weir members creates a low pressure adjacent the downstream sides of the weir members into which particulate material in the airstream in the intermediate category, designated generally by the numeral 180 in FIG. 18, moves so as to be extracted from the airstream as opposed to adhering to and promoting the clogging of the filter bag. When the vacuum cleaner is shut down, material 180 remains on the horizontally disposed weir members or, if the vacuum cleaner is tilted from right to left in FIG. 18, falls into the bottom of the bag.

It is also well known that certain upright vacuum cleaners operate with a filter bag having the air inlet opening at the lower end of rear wall 162 rather than the upper end as shown in FIG. 18. It will be appreciated that particle laden air entering the vertical filter bag at the lower end thereof will flow upwardly either along front wall 160 or rear wall 162 depending on whether the inlet opening is provided with an air director inside the bag similar to air director 172 shown in FIG. 18. Without such an air director, the particle laden air entering the filter bag would flow upwardly along rear wall 162. Accordingly, in the former situation weir members 176 would be located on front wall 160 and would operate as described as above whereas, with the latter situation, the weir members would be mounted on rear wall 162 so as to be operable in conjunction with the flow of the airstream upwardly there across. Similarly, if bag 158 shown in FIG. 18 is not provided with air director 172, the stream of particle laden air flowing into the filter bag would flow along a path in the direction opposite to that shown in FIG. 18, whereby weir members 176 would be mounted on rear wall 162 so as to be operable in response to the airstream flowing upwardly there across.

A further embodiment of a vacuum cleaner bag having a weir arrangement in accordance with the present invention is illustrated in FIGS. 19–22 of the drawing. In this embodiment, the vacuum cleaner bag is constructed by pleating opposite walls of a vacuum cleaner bag of air permeable material such as that illustrated in FIG. 22A and represented by the numeral 182. Bag 182 is generally rectangular in cross section and comprises top and bottom walls 184 and 186, respectively, front and back walls 188 and 190, respectively, and opposite end walls 192 and 194. Front wall 188 is provided with an inlet opening 196 bounded by a reinforcing element 198 of cardboard or the like which provides for attaching the bag to the air feed or inlet tube of a vacuum cleaner.

In this embodiment, the interior of the bag has weir members 200 as best seen in FIGS. 19 and 21. Weir members 200 are provided by displacing top and bottom walls 184 and 186 of the bag inwardly toward one another to form pleats 202 extending in the direction from end wall 192 toward end wall 194 and centrally between front and rear walls 188 and 190, and pleats 204 and 206 extending inwardly from end wall 194 in laterally offset relationship with respect to pleats 202. Pleats 202 are joined along a line 208 therebetween, such as by stitching or adhesive bonding, and pleats 204 and 206 are similarly joined along lines 210 and 212 therebetween, respectively. As will be best appreciated from FIG. 19, the lines of juncture 208, 210 and 212 extend inwardly from the corresponding side wall of the bag a distance sufficient to provide for the inner ends of the weir members 200 to produce a sinuous air flow path P with respect to the direction of airflow into the bag through inlet opening 196. Accordingly, as with the embodiments previously described, the air flow across the inner edges 200a of the weir members creates a pressure drop and a low pressure area adjacent the downstream sides of the weir members into which particulate material in the airstream in the intermediate category, designated generally by the numeral 214 in FIG. 19, moves so as to be extracted from the airstream.

In connection with the weir members in filter bags in accordance with the present invention, it will be appreciated that some of the small particulate material in the airstream to be cleaned will adhere to the weir members and thus be extracted from the airstream before reaching the inner surfaces of the walls of the bag through which the clean air flows. This advantageously further reduces the rate of clogging of the bag walls and increases the useful life of the filter bag.

While considerable emphasis has been placed on the preferred embodiments of the invention herein illustrated and described, it will be appreciated that other embodiments of the invention can be made and many changes can be made in the disclosed embodiments without departing from the principles of the present invention. Accordingly, it is to be distinctly understood that the foregoing descriptive matter is to be interpreted merely as illustrative of the present invention and not as a limitation.

What is claimed is:

1. In a vacuum cleaner including housing means having air inlet means and air outlet means, motor driven fan means for generating an airstream through said housing means in the direction from said air inlet means toward said outlet means, and filter means in said housing means for removing particulate material from said airstream, the improvement comprising: said filter means including filter bag means of air permeable material having opening means therein for the flow of said airstream into said filter bag means, weir means in said filter bag means intersecting said airstream downstream from said opening means, said weir means having upstream and downstream sides with respect to said direction of said airstream and edge means between said sides, said airstream having a transverse dimension, and said edge means intersecting said airstream about midway of said transverse dimension, whereby air flowing across said edge means creates a pressure drop across said weir means and a low pressure area adjacent said downstream side into which particulate material in said airstream is drawn by said pressure drop, said filter bag including a pair of opposed walls and said weir means including opposed portions of said opposed walls joined together along a line of juncture transverse to said direction of air flow.

2. A vacuum cleaner according to claim 1, wherein said opposed portions of said opposed walls includes a plurality of opposed portions each joined together along a corresponding line of juncture transverse to said direction of air flow, each said line of juncture being offset from the others in said direction of air flow.

3. A vacuum cleaner according to claim 1, wherein said filter bag includes a pair of opposed side walls transverse to said line of juncture and said line of juncture extends from one of said side walls toward the other and has an inner end spaced from said other side wall.

4. A vacuum cleaner according to claim 3, wherein said opposed portions of said opposed walls includes a plurality of opposed portions each joined together along a corresponding line of juncture transverse to said direction of air flow, each said line of juncture being offset from the others in said direction of air flow.

5. A vacuum cleaner according to claim 4, wherein each succeeding line of juncture with respect to said direction of air flow extends from a different one of said pair of side walls.

6. A filter bag for a vacuum cleaner comprising wall means of air pervious material, said wall means providing said bag with an interior, means providing opening means for the flow of a stream of particle laden air into said interior along a path, weir means in the interior of said filter bag transverse to said path and having upstream and downstream sides with respect to the direction of air flow along said path, said weir means including edge means between said sides and intersecting said stream of air, whereby particle laden air flows across said edge means for creating pressure drop across said weir means and a lower pressure area adjacent said downstream side into which particles in said airstream are drawn by said pressure drop, said filter bag including a pair of opposed walls, and said weir means including opposed portions of said opposed walls joined together along a line of juncture transverse to said direction of air flow.

7. A filter bag according to claim 6, wherein said opposed portions of said opposed walls includes a plurality of opposed portions each joined together along a corresponding line of juncture transverse to said direction of air flow, each said line of juncture being offset from the others in said direction of air flow.

8. A filter bag according to claim 6, wherein said filter bag includes a pair of opposed side walls transverse to said line of juncture and said line of juncture extends from one of said side walls toward the other and has an inner end spaced from said other side wall.

9. A filter bag according to claim 8, wherein said opposed portions of said opposed walls includes a plurality of opposed portions each joined together along a corresponding line of juncture transverse to said direction of air flow, each said line of juncture being offset from the others in said direction of air flow.

10. A filter bag according to claim 9, wherein each succeeding line of juncture with respect to said direction of air flow extends from a different one of said pair of side walls.

* * * * *